United States Patent
Hashimoto et al.

(10) Patent No.: US 8,553,003 B2
(45) Date of Patent: Oct. 8, 2013

(54) INPUT DETECTION METHOD, INPUT DETECTION DEVICE, INPUT DETECTION PROGRAM AND MEDIA STORING THE SAME

(75) Inventors: Kazuyuki Hashimoto, Hyogo (JP); Naoki Sumi, Hyogo (JP); Yoshikazu Matsui, Hyogo (JP)

(73) Assignee: Chimei Innolux Corporation, Chu-Nan (TW)

( * ) Notice: Subject to any disclaimer, the term of this patent is extended or adjusted under 35 U.S.C. 154(b) by 239 days.

(21) Appl. No.: 13/212,167

(22) Filed: Aug. 17, 2011

(65) Prior Publication Data
US 2012/0044204 A1 Feb. 23, 2012

Related U.S. Application Data

(60) Provisional application No. 61/375,790, filed on Aug. 20, 2010.

(30) Foreign Application Priority Data

Nov. 26, 2010 (JP) .................. 2010-263228

(51) Int. Cl.
*G06F 3/041* (2006.01)
*G09G 5/00* (2006.01)

(52) U.S. Cl.
USPC .......................... 345/173; 345/156

(58) Field of Classification Search
USPC ............ 345/156–184, 104; 178/18.01–20.04; 715/863
See application file for complete search history.

(56) References Cited

U.S. PATENT DOCUMENTS

| | | | | |
|---|---|---|---|---|
| 5,825,352 A | * | 10/1998 | Bisset et al. | 345/173 |
| 6,144,366 A | * | 11/2000 | Numazaki et al. | 345/156 |
| 2008/0309629 A1 | * | 12/2008 | Westerman et al. | 345/173 |
| 2009/0284495 A1 | * | 11/2009 | Geaghan et al. | 345/174 |
| 2010/0079397 A1 | * | 4/2010 | Yang et al. | 345/173 |
| 2010/0097328 A1 | * | 4/2010 | Simmons et al. | 345/173 |
| 2010/0097329 A1 | * | 4/2010 | Simmons et al. | 345/173 |
| 2010/0258360 A1 | * | 10/2010 | Yilmaz | 178/18.06 |
| 2010/0295796 A1 | * | 11/2010 | Roberts et al. | 345/173 |
| 2011/0084927 A1 | * | 4/2011 | Chang et al. | 345/173 |
| 2011/0102339 A1 | * | 5/2011 | Lin et al. | 345/173 |
| 2011/0169763 A1 | * | 7/2011 | Westerman et al. | 345/173 |
| 2011/0175837 A1 | * | 7/2011 | Westerman et al. | 345/173 |
| 2012/0013561 A1 | * | 1/2012 | Chang et al. | 345/173 |
| 2013/0106732 A1 | * | 5/2013 | Chao et al. | 345/173 |

* cited by examiner

*Primary Examiner* — Vijay Shankar
*Assistant Examiner* — Patrick F Marinelli
(74) *Attorney, Agent, or Firm* — Liu & Liu

(57) ABSTRACT

The invention provides an input detection method, wherein when multiple touch points are input a touch sensor 30 detects touch points 41, 42 individually. The detection method includes: scanning a first electrode line, and if a plurality of touch areas 43, 45 sandwiching a non-touch area 44 are detected, labeling the plurality of touch areas 43, 45 sequentially; determining the location of the non-touch area as a separation area in the case where the non-touch area between the labels is within a predetermined spacing; when a second electrode line next to the first electrode line where a separation area is detected is scanned, handling the area on the second electrode line corresponding to the separation area on the first electrode line as a separation area; and practicing the above steps for every electrode line and detecting the labels.

14 Claims, 17 Drawing Sheets

INPUT DETECTION METHOD, INPUT DETECTION DEVICE, INPUT DETECTION PROGRAM AND MEDIA STORING THE SAME

CROSS REFERENCE TO RELATED APPLICATIONS

This application claims the benefit of U.S. Provisional Application No. 61/375,790, filed Aug. 20, 2010, the entirety of which is incorporated by reference herein.

BACKGROUND OF THE INVENTION

1. Field of the Invention

The present invention relates to an input detection method, an input detection device, an input detection program, and a media storing the same, and in particular relates to an input detection method, an input detection device, an input detection program, and a media storing the same capable of separating and detecting multiple touch points input to a touch sensor which has electrodes arranged in a matrix therein and scans the electrodes line by line to detect touch inputs.

2. Description of the Related Art

In the past, an image processing device, an image processing method, an image input device, and an image input/output device for an image represented by two-valued data have been disclosed (for example, refer to Japanese Patent Application Publication no. 2010-39732). In the disclosure, when a pixel is scanned, it will be determined as an attention pixel or a peripheral pixel according to the data value of the pixel. In the case where the pixel is an attention pixel, this pixel is distributed with a register number (label) representing an identification number of an entire connection area of the image, wherein additional information (location information and area information) of the entire connection area corresponding to a label is updated. By the above operation, after image scanning, all labels and location information of the entire image can be acquired, respectively, thereby a high-speed labeling operation may be performed.

However, for an image input device using the above image processing method, in the case where multiple touch inputs constituted by two fingers are very close, the two fingers may be identified as one lump and then attached with only one label. Therefore, the multiple touch inputs would not be detected correctly.

In recent years, multi-touch screens have been popularly utilized in devices like smart phones. If multiple touch inputs are not detected correctly, a pinch in action wherein two fingers griping an operable object on the screen are moved toward each other to minify the picture, or a pinch out action wherein two fingers are moved away from each other to magnify the picture may not be identified correctly, causing the device to make a wrong response.

The purpose of the invention is providing an input detection method, an input detection device, an input detection program, and a media storing the same capable of correctly detecting multiple touch inputs even though the touch points are close to each other.

BRIEF SUMMARY OF THE INVENTION

A detailed description is given in the following embodiments with reference to the accompanying drawings.

The first invention is an input detection method for separately detecting multiple touches input to a touch sensor, wherein the touch sensor is provided with a plurality of electrodes arranged in a matrix, and the touch sensor detects the multiple touches by sequentially scanning electrode lines where the electrodes are arranged. The input detection method comprises: (a) scanning a first electrode line to detect whether a plurality of contact areas sandwiching a non-touch area exist in the scanning direction; (b) labeling the plurality of contact areas in sequence; (c) determining the non-contact area between the labels as a separation area in the case where the non-touch area between the labels is within a predetermined spacing; (d) handling an area on a second electrode line, which is to be scanned after the first electrode line, as a separation area, wherein the location of the area on the second electrode line corresponds to the location of the separation area detected on the first electrode line; and (e) performing steps (a)~(d) in sequence for each electrode line, and finding the central locations of the touches according to the labels.

Therefore, in the case where a plurality of close fingers touch a touch panel, the gap between the fingers can be detected, and the multiple touches can be obtained correctly from the gaps.

The feature of the second invention is that in the input detection method of the first invention, the touch sensor is set with a predetermined coordinate system, and the predetermined spacing is a distance of one coordinate or two coordinates.

Therefore, in addition to correctly detecting the typical touch state of touches caused by a plurality of close fingers, the detection of separated fingers, which is not difficult, and non-contact areas caused by biased pressure can be excluded from detection, and multiple touch inputs caused by close fingers, which are detection targets, can be accurately detected.

The feature of the third invention is that in the input detection method of the first invention, the electrodes are scanned from at least one direction parallel to the column or the row of the matrix.

The feature of the fourth invention is that in the input detection method of the third invention, the electrodes are scanned from two directions which are parallel to the column and the row of the matrix, respectively.

Therefore, even if spacing exists in a direction different to the normal scanning direction, multiple touches can still be detected.

The feature of the fifth invention is that in the input detection method of the fourth invention, after all of the electrodes are scanned from one direction, scanning from the other direction begins.

The feature of the sixth invention is that in the input detection method of the fifth invention, scanning along the horizontal direction comprises scanning from the bottom electrode line to the top electrode line and scanning from the top electrode line to the bottom electrode line, and scanning along the vertical direction comprises scanning from the left electrode line to the right electrode line and scanning from the right electrode line to the left electrode line.

Therefore, scanning is performed two times for each direction so that the multiple touches can be more correctly detected.

The seventh invention is an input detection device, for separately detecting multiple touches input to a touch sensor, wherein the touch sensor is provided with a plurality of electrodes arranged in a matrix, and the touch sensor detects the multiple touches by sequentially scanning electrode lines where the electrodes are arranged. The input detection device comprises: a scanning part scanning a first electrode line to detect whether a plurality of contact areas sandwiching a non-touch area exist; a labeling part labeling the plurality of contact areas in sequence; a separation area detection part determining the non-contact area between the labels as a separation area in the case where the non-touch area between the labels is within a predetermined spacing; a positive switch-off part handling an area on a second electrode line, which is to be scanned after the first electrode line, as a separation area, wherein the location of the area on the second electrode line corresponds to the location of the separation area detected on the first electrode line; and a location calculation part calculating the central locations of the touches according to the labels after the scanning part, the labeling part, separation area detection part, and the positive switch-off part finish operations for each of the electrode lines.

The feature of the eighth invention is that in the input detection device of the seventh invention, the touch sensor is set with a predetermined coordinate system, and the predetermined spacing is a distance of one coordinate or two coordinates.

The feature of the ninth invention is that in the input detection device of the seventh invention, the electrodes are scanned from at least one direction parallel to the column or the row of the matrix.

The feature of the tenth invention is that in the input detection method of the ninth invention, the electrodes are scanned from two directions which are parallel to the column and the row of the matrix, respectively.

The feature of the eleventh invention is that in the input detection device of the tenth invention, after all of the electrodes are scanned from one direction, scanning from the other direction begins.

The feature of the twelfth invention is that in the input detection device of the eleventh invention, scanning along the horizontal direction comprises scanning from the bottom electrode line to the top electrode line and scanning from the top electrode line to the bottom electrode line, and scanning along the vertical direction comprises scanning from the left electrode line to the right electrode line and scanning from the right electrode line to the left electrode line.

The feature of the thirteenth invention is that the input detection device of the seventh invention further comprises a touch sensor module and a driving circuit for the touch sensor module.

The feature of the fourteenth invention is that the input detection device of the thirteenth invention further comprises a liquid crystal display device displaying the input image of the touch sensor, wherein the liquid crystal display device is disposed so as to be overlapped with the touch sensor.

The fifteenth invention is a computer readable media storing an input detection program, wherein the input detection program is executed by the computer to perform the input detection method of the first invention.

The sixteenth invention is an input detection program executed by a computer to perform the input detection method of the first invention.

According to the invention, multiple touches input to a touch panel can be detected separately.

BRIEF DESCRIPTION OF THE DRAWINGS

The present invention can be more fully understood by reading the subsequent detailed description and examples with references made to the accompanying drawings, wherein:

FIG. 5 is a diagram for describing the determination method for a separation area in the input detection method and the input detection device in accordance with the Embodiment 1, wherein

FIG. 7 shows an input detection result according to the conventional input detection method and input detection device, wherein

FIG. 8 shows an input detection result according to the input detection method and input detection device of the Embodiment 1, wherein

FIG. 11 is a diagram showing an example of the structure of the input detection device in accordance with the Embodiment 4, wherein

FIG. 12 is a diagram showing that the X electrodes and the Y electrodes are overlapped, wherein

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
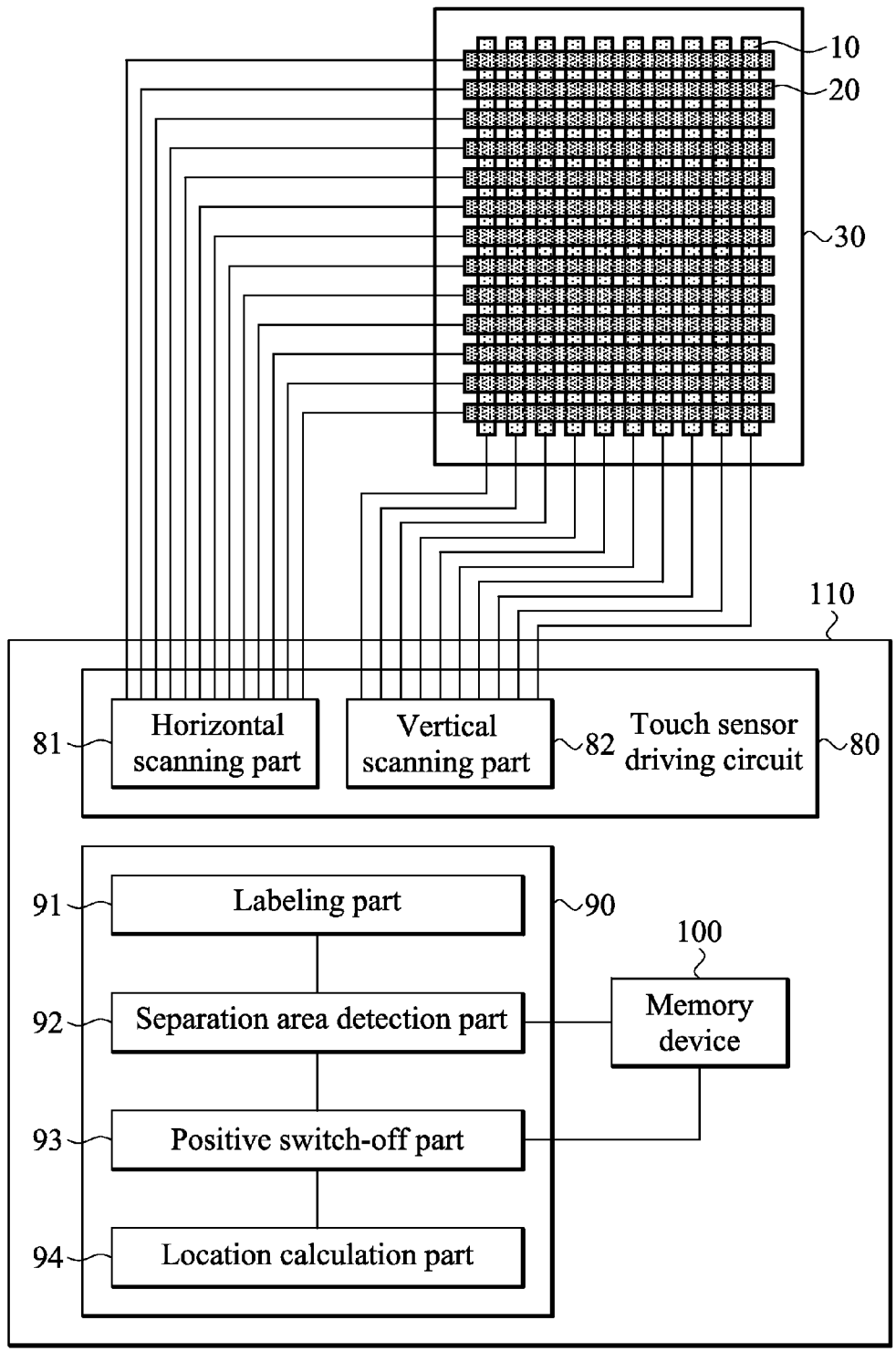
FIG. 1 is a block diagram showing the entire structure of an input detection device according to an embodiment of the invention.

FIG. 1 is a block diagram showing the entire structure of an input detection device according to an embodiment of the invention. In FIG. 1, the input detection device comprises X electrodes 10, Y electrodes 20, a touch sensor 30, a touch sensor driving circuit 80, a calculation device 90 and a memory device 100. The touch sensor driving circuit 80 comprises an X electrode scanning part 81 and a Y electrode scanning part 82. The calculation device 90 comprises a labeling part 91, a separation area detection part 92, a positive switch-off part 93, and a location calculation part 94. The touch sensor driving circuit 80, the calculation device 9, and the memory device 100 form a touch sensor controller 110.

The touch sensor 30 has an input surface covered with transparent materials such as glass. The touch sensor 30 is an input detection device which detects touch inputs when the input surface is contacted with a finger or other objects having conductivity. The touch sensor 30 is provided with X electrodes 10 and Y electrodes 20, which are perpendicularly arranged to form a matrix, therein. Various kinds of touch sensors can be adopted as the touch sensor 30 as long as multiple touch points can be detected. For example, a projected capacitive touch sensor can be utilized. The projected capacitive touch sensor uses one of an X electrode 10 or Y electrode 20 as a driving electrode and the other as a signal receiving electrode. A driving pulse is supplied from the driving electrode, and the touch sensor 30 detects touch inputs on the input surface by measuring capacitance from a current flowing at the time when a conductor such as a finger touches the input surface.

The X electrodes 10 are used to detect the touch input location in the horizontal direction and arranged along the vertical direction of the input surface in parallel. The Y electrodes 20 are used to detect the touch input location in the vertical direction and arranged along the horizontal direction of the input surface in parallel. In FIG. 1, the X electrodes 10 and the Y electrodes have stripe shapes. However, if line electrodes arranged along the vertical direction and line electrodes arranged along the horizontal direction are crossed and perpendicularly arranged in a matrix form, the X electrodes 10 and the Y electrodes can be constructed by electrodes having various kinds of shapes. For example, an X electrode 10 or a Y electrode may be a line electrode constructed by many small squares connected in serial, wherein a square uses angles to connect to the other squares.

The input surface of the touch sensor 30 is set with predetermined coordinates as detection units. A coordinate can be set at an intersection point of an X electrode 10 and a Y electrode 20. If a detection operation is performed for getting an average of the electrostatic capacitances of a plurality of electrodes, a coordinate can be set at a location deviated from the intersection points of the X electrodes 10 and Y electrodes 20.

The touch sensor controller 110 is used to control the touch sensor 30 and provided with a touch sensor driving circuit 80, a calculation device 90, and a memory device 100.

The touch sensor driving circuit 80 is used to drive the touch sensor 30. The touch sensor driving circuit 80 provides the driving pulse mentioned above and drives the touch sensor 30 so as to scan the X electrodes 10 and the Y electrodes 20 to detect the existence of touch inputs on the input surface of the touch sensor 30 and touch information such as a touch location.

The touch sensor driving circuit 80 is provided with a horizontal scanning part 81 and a vertical scanning part 82. The horizontal scanning part 81 scans Y electrodes 20 along the horizontal direction and measures electrostatic capacitances of the horizontal electrode lines. The vertical scanning part 82 scans X electrodes 10 along the vertical direction and measures electrostatic capacitances of the vertical electrode lines. Note that if electrode scanning is performed only on one of the X electrode 10 and the Y electrode 20, only one of the horizontal scanning part 81 and the vertical scanning part 82 is necessary.

The calculation device 90 is used to execute various calculations comprising a calculation for handling separated multiple touch points. If required calculation can be executed, the calculation device 90 can be constructed by various kinds of means. For example, the calculation device 90 can be realized by electric circuits such as a CPU (Central Processing Unit), or an ASIC (Application Specific Integrated Circuit).

To realize a specific function, the calculation device 90 comprises a labeling part 91, a separation area detection part 92, a positive switch-off part 93, and a location calculation part 94. The labeling part 91 attaches a label to a location of a touch input (namely, labels the detected touch data) after the touch input is detected. If the labeling part 91 attaches a plurality of labels on one electrode line and the distance between the labels is within a predetermined spacing, the separation area detection part 92 will determine a non-touch area between the labels as a separation area. In the case where a electrode line is scanned and a separation area is detected by the separation area detection part 92 therein, when the next electrode line is scanned, the positive switch-off part 93 will switch off the detection of the location (called a switch-off location) on this electrode line corresponding to the separation area and handle the switch location as a non-touch data. After the labeling operation, the location calculation part 94 calculates touch locations according to attached labels.

The calculation device 90 uses the labeling part 91, the separation area detection part 92, the positive switch-off part 93, and the location calculation part 94 to perform a separation algorism, wherein multiple touch inputs located at near locations are separated and detected. The specific function realized by each one of the parts 91-94 is described later.

The memory device 100 is used to store the location of the separation area detected by the separation area detection part 92. If electrode scanning is performed along one of the horizontal direction and the vertical direction, being a memory device 100, a frame memory storing detection data of the entire input surface is not necessary. A line memory storing detection data of at least one line is enough. In response to needs, the memory device 100 can adopt a memory capable of storing detection data of a plurality of lines. If electrode scanning is performed along both of the horizontal direction and the vertical direction, a frame memory can be adopted as the memory device 100. The location of the separation area stored by the memory device 100 is used by the positive switch-off part 93 to set the switch-off location.

Though the touch sensor controller 110 comprises the above parts, other kinds of parts capable of realizing the necessary function for controlling the touch sensor 30 can be used.

Figure 2:
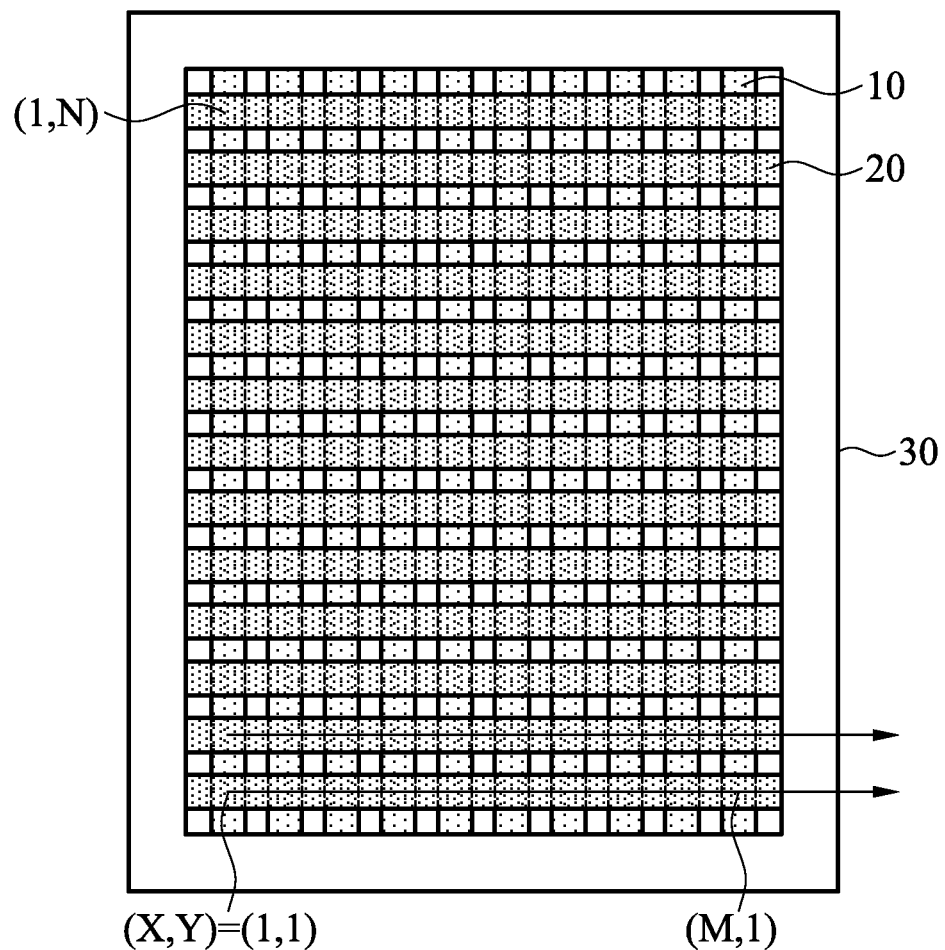
FIG. 2 is diagram showing an example of the inner structure of the touch sensor.

FIG. 2 is diagram showing an example of the inner structure of the touch sensor 30. As described with FIG. 1, the X electrodes 10 which extend in the vertical direction and the Y electrodes 20 which extend in the horizontal direction are arranged in a form of a matrix in the touch sensor 30. In FIG. 2, there are M lines of X electrodes 10 and N lines of Y electrodes 20. Therefore, an M×N matrix (M columns and N rows) is formed. Following, a coordinate system is set corresponding to the matrix such that the left bottom corner (X, Y) is (1, 1), the right bottom corner (X, Y) is (M, 1), the left top corner (X, Y) is (1, N), and the right top corner (X, Y) is (M, N).

In the coordinate system, when scanning is performed on the Y electrodes 20 along the horizontal direction from the bottom to the top, the touch data are read out in the sequence of (1, 1)→(2, 1)→...(M, 1)→(1, 2)→...(M−1, N)→(M, N). In this way, signals at coordinates on an electrode line are read out in sequence. When scanning of one electrode line is finished, the next electrode line is scanned. Therefore, detection data of each electrode line are read out. As a result, the touch data of all coordinates of all electrode lines are read out.

Figure 3:
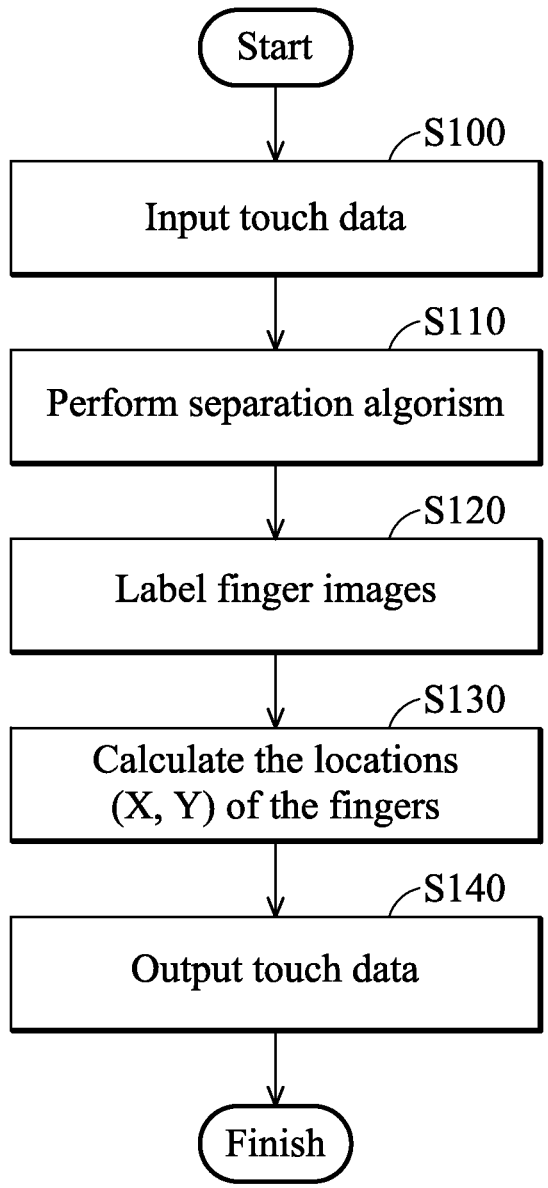
FIG. 3 is a flow chart showing an example of the input detection method in accordance with the Embodiment 1.

FIG. 3 is a flow chart showing an example of the input detection method in accordance with the Embodiment 1. An element which is identical to the element described before is marked with the same reference number and the description thereof is omitted.

In FIG. 3, touch data is input to the touch sensor 30 at step 100. Namely, touch data concerning the existence of a touch on the input surface is read out by the scanning parts 81 and 82. Note that the touch data can be a two-valued data only for showing the existence of a touch, but the touch data can also be a number of bits, such as 6 bits or 8 bits, for showing the intensity of the touch.

At step 110, a separation algorism is performed, wherein labels which are attached according to the fingers touching the input surface are separated. Details for the separation algorism will be described later.

At step 120, a labeling operation for finger images is performed. Specifically, a labeling operation for finger images which are separated and identified by processing the separation algorism at step 110 is performed. Namely, the separation algorism is carried out at each coordinate of each electrode line, and when the separation algorism is finished, the labeling operation is performed for each connected element. Therefore, a finger is identified as a lump.

At step 130, the locations of the fingers are calculated. The labeling operation performed as step 120 can determine the coordinates touched by a finger and identify the intensity of detected signals. Therefore, a location of a finger can be calculated by a weight average calculation wherein the intensity of detected signals and the corresponding coordinates are used. Then follow-up operations using the locations of the fingers can be performed easily.

In this way, for the input detection device of the invention, the locations of the fingers touching the input surface can be detected correctly, and according to the detected location of the fingers, an appropriate input operation responding to the movement of the fingers can be performed.

In the embodiment, touch inputs implemented by fingers contacting the input surface are taken as an example, but touch inputs implemented by conductive objects are also possible. Here, the object for touch input is not limited.

Figure 4:
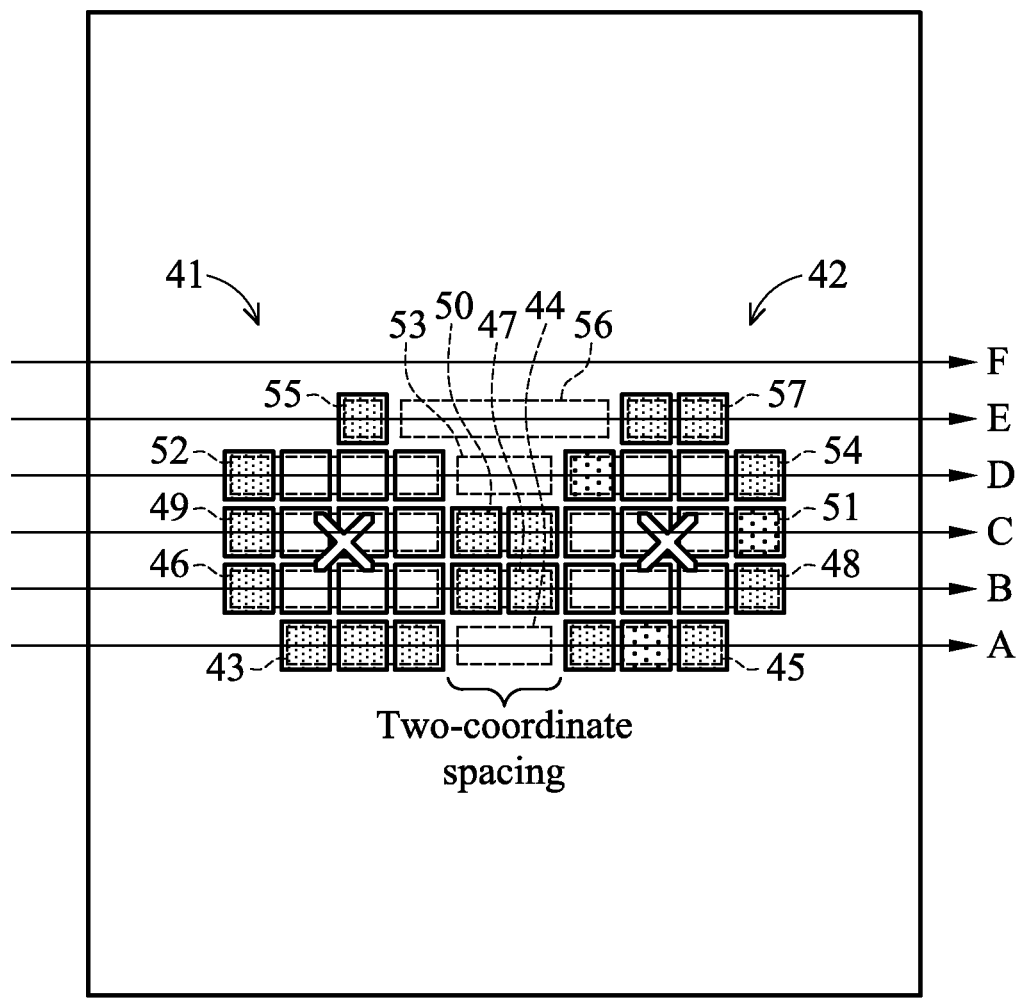
FIG. 4 is a diagram for describing the separation algorism of the input detection method in accordance with the Embodiment 1.

FIG. 4 is a diagram for describing the separation algorism of the input detection method in accordance with the Embodiment 1. In FIG. 4, a state is shown, wherein a touch image comprising two points 41 and 42 is detected. Now an example is described where each of lines A~F is scanned in sequence from the line A to the line F under this state and the separation algorism is performed.

First, the horizontal scanning part 81 scans the line A from the left side of the FIG. 4 to the right side. In the beginning, a contact area 43 is detected on the line A and attached with Label 1. Label attaching can be implemented by the labeling part 91. Following, a non-contact area 44 possessing two coordinates is detected. The non-contact area 44 is detected in the way that an off signal representing no touch data is detected. Following, a contact area 45 is detected and attached with Label 2. In the case where the non-contact area 44 between the contact area 43 and the contact area 45 is within a predetermined spacing, the non-contact area 44 is determined as a separation area and the separation algorism is activated. The spacing can be set at a distance or a number of coordinates in the case where a coordinate system is set. In the Embodiment 1, suppose that the separation algorism is activated in the case where the coordinates possessed by the non-contact area is equal to or less than two coordinates. Therefore, because the number of coordinates possessed by the non-contact area is two, the separation algorism is activated. Whether the non-contact area 44 is a separation area is detected or determined by the separation area detection part 92. The location of the separation area (the non-contact area 44) will be stored in the memory device 100 if necessary.

Next, the horizontal scanning part 81 scans the line B from the left side to the right side. A contact area 46 is detected on the line B and then attached with Label 1 by the labeling part 91. Then a two-coordinate spacing on the line B is switched off and becomes a switch-off area 47, wherein the location of the two-coordinate spacing is shifted from the location of the separation area (the non-contact area 44) detected on the previous line A. The switch-off area 47 is handled as a non-contact area. Although touch signals are detected in the switch-off area 47 practically, the switch-off area 47 is handled as an area having no touch signals in separation algorism. Then a contact area 48 is detected on the line B and attached with Label 2. Setting the switch-off area 47 on the line B is implemented by the positive switch-off part 93. If the memory device 100 of the touch sensor controller 110 is a line memory, of which the memory capacity is one line, the positive switch-off part 93 is allowed not to rewrite the non-contact area 44 of line A stored in the memory device 100, and uses the location data of the non-contact area 44 of line A stored in the memory device 100 to set the switch-off area 47 on line B.

In the scanning of line B, the switch-off area 47 possessing two coordinates is detected and then handled as a separation area by the separation area detection part 92. The separation algorism is also activated in the scanning of the next line C. Furthermore, if necessary, the switch-off area 47 can be stored as a separation area in the memory device 100.

Next, the horizontal scanning part 81 scans line C. Because a separation area (the switch-off area 47) existing on the previous line B is identified, the switch-off area 47 is shifted to line C in the scanning of line C, and the two coordinates become a switch-off area 50 and are handled as a separation area. In the scanning of line C, two contact areas 49, 51 sandwiching a switch-off area 50 are detected, wherein the contact areas 49 is attached with Label 1, the contact areas 51 is attached with Label 2, and the switch-off area 50 is determined as a separation area. The separation algorism is also activated in the scanning of the next line D.

In the scanning of line D, the area which is shifted from the switch-off area 50 on the previous line C is switch off and becomes a switch-off area 53. The switch-off area 53 is handled as a separation area. On line D, though the detection signals on the switch-off area 53 show non-contact practically, because the separation algorism is activated after the scanning of line C, the switch-off area 53 is handled as a non-contact area regardless of the actual detection signals. In the scanning of line D, two contact areas 52, 54 sandwiching a switch-off area 53 are detected, wherein the contact areas 52 is attached with Label 1, the contact areas 54 is attached with Label 2, and the switch-off area 53 is a two-coordinate non-contact area determined as a separation area. The separation algorism is also activated in the scanning of the next line E.

Next, in the scanning of line E, a contact area 55, a non-contact area 56, and the contact area 57 are detected in sequence. Here, the non-contact area 56 on line E includes the two-coordinate area which is shifted from the switch-off area 53 and then switched off. However, the actual non-contact area is larger than the two-coordinate area. Here, the non-contact area 56, which is a four-coordinate area, is detected. In this case, because the non-contact area 56 is not within the predetermined spacing (two coordinates), the separation algorithm is not activated in the scanning of the next line F. Then the contact areas 55 and 57 are attached with Label 1 and Label 2, respectively.

In the scanning of the next line F, the separation algorism is not activated, and the scanning is performed under the state where no switch-off areas exist. If contact areas are detected on line F, the contact areas are labeled in sequence. However, in FIG. 4, there are no contact signals and the attaching of Label 1 and Label 2 is finished.

Finally, all lines are scanned. According to the attached labels, the contact points of the contact areas attached with Label 1 and Label 2 are detected independently, and the locations thereof are calculated. Therefore, Label 1 and Label 2 are detected separately, such that multiple touch inputs can be detected.

In this way, according to the input detection method and the input detection device of the embodiment, multiple touch inputs can be separated and detected correctly.

FIG. 5 is a diagram for describing the determination for a separation area in the input detection method and the input detection device in accordance with Embodiment 1.

Figure 5A:
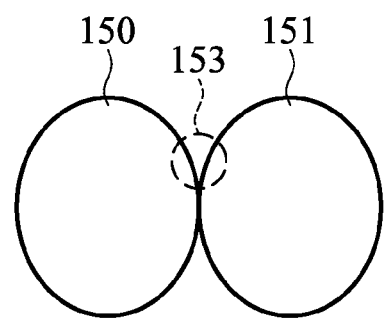
FIG. 5A shows an example a multi-touch state.

FIG. 5A shows an example a multi-touch state caused by two close fingers 150 and 151 contacting the touch panel 30. As shown in FIG. 5A, two fingers 150 and 151 are close to each other and form an acute-angled V zone 153.

Figure 5B:
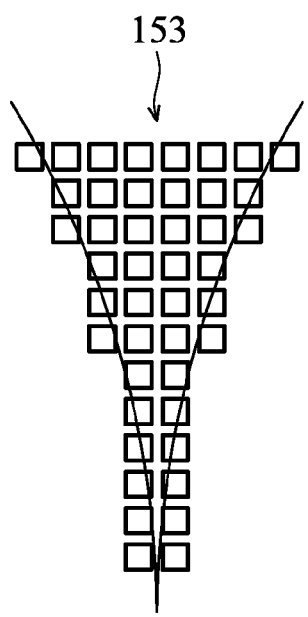
FIG. 5B is an enlarged diagram for the V zone, and FIG. 5C show a situation where a part of a finger is detected as non-contact.

FIG. 5B is an enlarged diagram for the V zone 153. As shown in FIG. 5B, the V zone 153 has a one coordinate spacing and/or a two coordinate spacing between the fingers 150 and 151. Therefore, by detecting the one-coordinate spacing and the two-coordinate spacing, the state where the fingers 150 and 151 are close together can be detected.

Figure 5C:
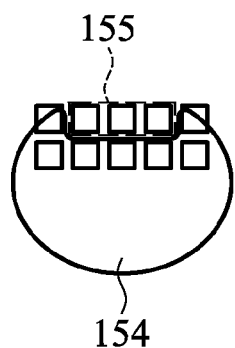

FIG. 5C show a situation where pressure generated from pressing of a finger 154 is biased and a part of the finger 154 is detected as non-contact. Under this situation, the non-contact area 155 within the area of the finger 154 possessing three coordinates is detected, as shown in FIG. 5C. This situation is different from the non-contact area formed by the V zone 153 shown in FIGS. 5A and 5B. Therefore, when a non-contact area formed by the V zone 153, possessing less than two coordinates, is detected, multiple touch inputs will be confirmed. At this time, if an operation for separating labels is performed, a biased contact due to a finger shown in FIG. 5C being determined as multiple touch inputs may be prevented. Therefore, in the Embodiment 1, in the case where two contact areas sandwich a two-coordinate non-contact area 44, multiple touch inputs are confirmed and the operation for separating labels is performed. In this way, by setting the length of the non-contact area to an appropriate distance so that the V zone 153 can be detected, multiple touch inputs which are close to each other can be detected precisely.

In the embodiment, a spacing possessing less than two coordinates is determined as a separation area, but if a unit of the detection element is very small, a spacing possessing less than three coordinates can be determined as a separation area. If a unit of the detection element is very large, a spacing possessing less than one coordinate can be determined as a separation area. The spacing of the non-contact area 44 for determining the separation area can be set appropriately according to the purpose or the specifications for the touch panel 30.

Figure 6:
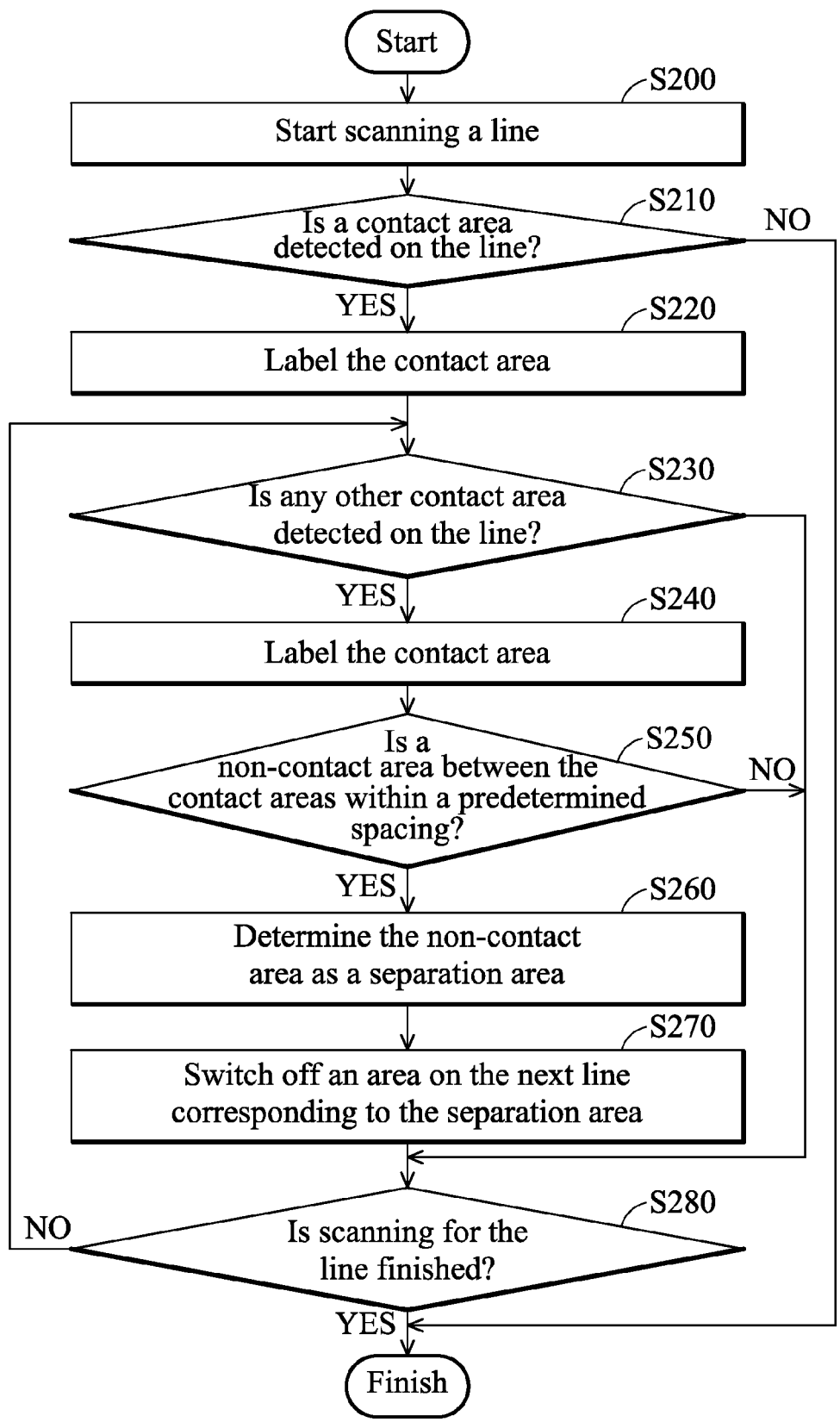
FIG. 6 is a flow chart showing an example of separation algorism of the input detection method and the input detection device applied for one line in accordance with the Embodiment 1.

FIG. 6 is a flow chart showing an example of separation algorism of the input detection method and the input detection device applied for one line in accordance with the Embodiment 1. An element which is identical to the element described before is marked with the same reference number. Meanwhile, for easy understanding, the flow chart is made to correspond to contents and elements of FIG. 4.

At step 200, scanning for a line which is a scan target begins by the horizontal scanning device 81.

At step 210, whether a contact area is detected is determined. If a contact area 43 is detected, the flow proceeds to step 220. Otherwise, if no contact area is detected, the flow is finished and then started from the beginning for a line which is the next scan target.

At step 220, the detected contact area 43 is labeled. Being the first contact area detected on the line, the contact area 43 is attached with Label 1 generally. After the contact area 43 is attached with Label 1, scanning for the line continues.

At step 230, whether another contact area is detected is determined. If another contact area 45 is detected, the flow proceeds to step 240. Otherwise, if no other contact area is detected, the flow proceeds to step 280 to determine whether the scanning for the line is finished. If the scanning for the line is finished, the flow is finished. If the scanning for the line is not finished, the flow proceeds to step 230 to continue scanning.

At step 240, the second contact area 45 is labeled. The number of the attached label is according to the detection order. Generally, the label number is 2 in the second detection, and the label number is 3 in the third detection.

Here, steps 200~240 are called labeling steps.

At step 250, whether the spacing of the non-contact area 44 between the contact area 45 detected at step 240 and the contact area 43 detected at step 220 is within a predetermined range is determined. For example, in the case where the predetermined range is 2 coordinates, whether the spacing of the non-contact area 44 is within 2 coordinates is determined.

At step 250, the spacing of the non-contact area 44 between the contact areas 43 and 45 is within a predetermined range, thus, the flow proceeds to step 260. Otherwise, if the spacing of the non-contact area 44 is longer than the predetermined range, the flow proceeds to step 280 to determine whether the scanning for the line is finished. If the scanning for the line is not finished, the flow proceeds to step 250 to continue scanning.

At step 260, the non-contact area 44 is determined as a separation area and the separation algorism is activated for the next line. Therefore, a separation area which separates a two labeled contact area is detected so that the separation algorism can be activated in the scanning for the next line.

Here, steps 250 and 260 are called separation area detection steps.

At step 270, the operation required for shifting a separation area to the next line and switching off the corresponding area is performed. For example, storing the location of the separation area in the memory device 100, switching of the corresponding area in the scanning of the next line, and not rewriting the data stored in the memory device 100 can be performed. Here, step 270 is called a switch-off step.

At step 280, whether scanning for one line is finished is determined. If scanning for one line is not finished, the flow proceeds to step 230. Otherwise, if scanning for one line is finished, the flow is finished and then started from the beginning for the next line. At this time, in the flow for the next line, in the case where a switch-off operation for the next line has been performed at step 270, the area on the next line which is shifted from a separation area will be handled as a non-contact area. Here, the step 280 and the step 270 can be called switch-off steps (or only the step 280, replacing step 270, can be called a switch-off step). The switch-off step is for performing a switch-off operation in the scanning of the next line.

Finally, the flow is performed for all lines of the touch sensor. After labeling, the locations of touch inputs are calculated according to the flow shown in FIG. 3.

In this way, according to the input detection method and the input detection device of the embodiment, multiple touch inputs can be separated in real time without complicated calculation such as image processing.

Figure 7A:
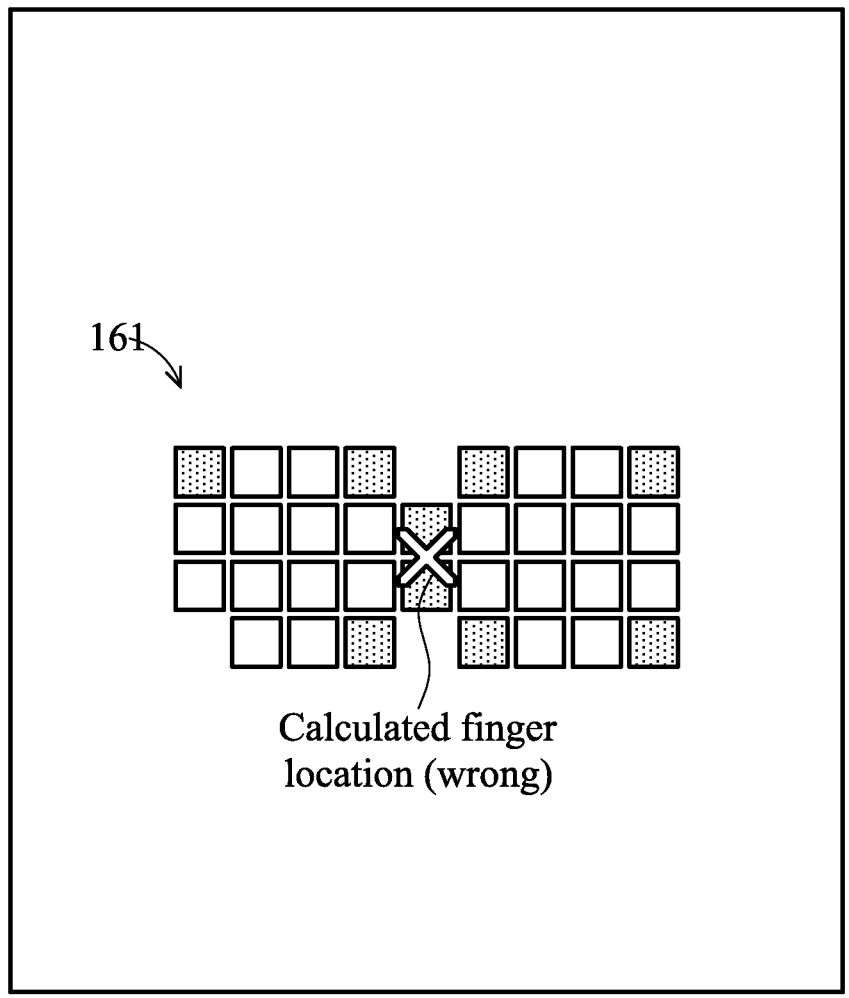
FIG. 7A shows a situation where two fingers are detected as having a V zone occupying one coordinate.
Figure 7B:
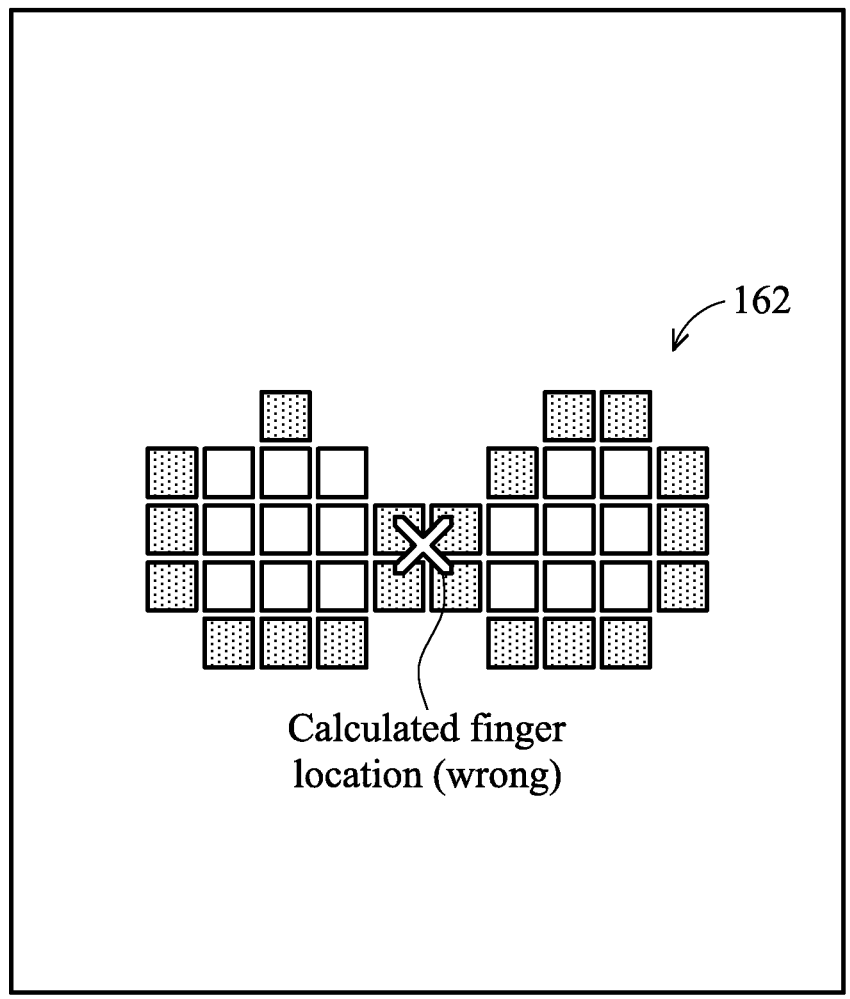
FIG. 7B shows a situation where two fingers are detected as having a V zone occupying two coordinates.

FIG. 7 shows an input detection result according to the conventional input detection method and input detection device. FIG. 7A shows a situation where two fingers are detected as having a V zone occupying one coordinate. FIG. 7B shows a situation where two fingers are detected as having a V zone occupying two coordinates.

In FIG. 7A, there are two lines having a one-coordinate spacing between two fingers. If each line is scanned without applying the input detection method of the invention, because a connection part exists between two fingers, a contact image 161, which is a huge lump, is identified and attached with only one label. Then after calculation, the location of the central part of the contact image 161, which should be a spacing, is determined as the location of a touch input.

In FIG. 7B, there are two lines having a two-coordinate spacing between two fingers. The central part is determined as a contact area, so a contact image 162, which is a huge lump, is identified. Then after calculation, the location of the central part of the contact image 162, which should be a spacing, is determined as the location of a touch input.

Wrong detection as described above cause movement implemented by two fingers such as pinch in, pinch out, and sliding to be identified incorrectly. As a result the device may make a wrong response.

Figure 8A:
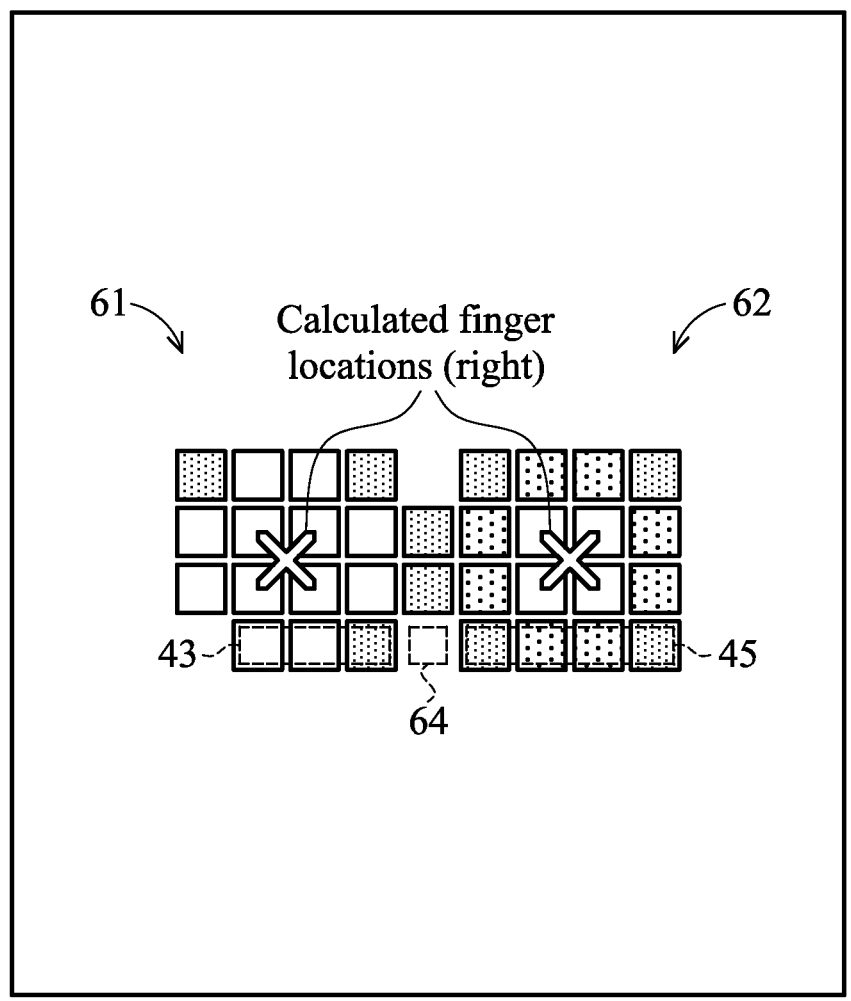
FIG. 8A shows a situation where two fingers are detected as having a V zone occupying one coordinate.
Figure 8B:
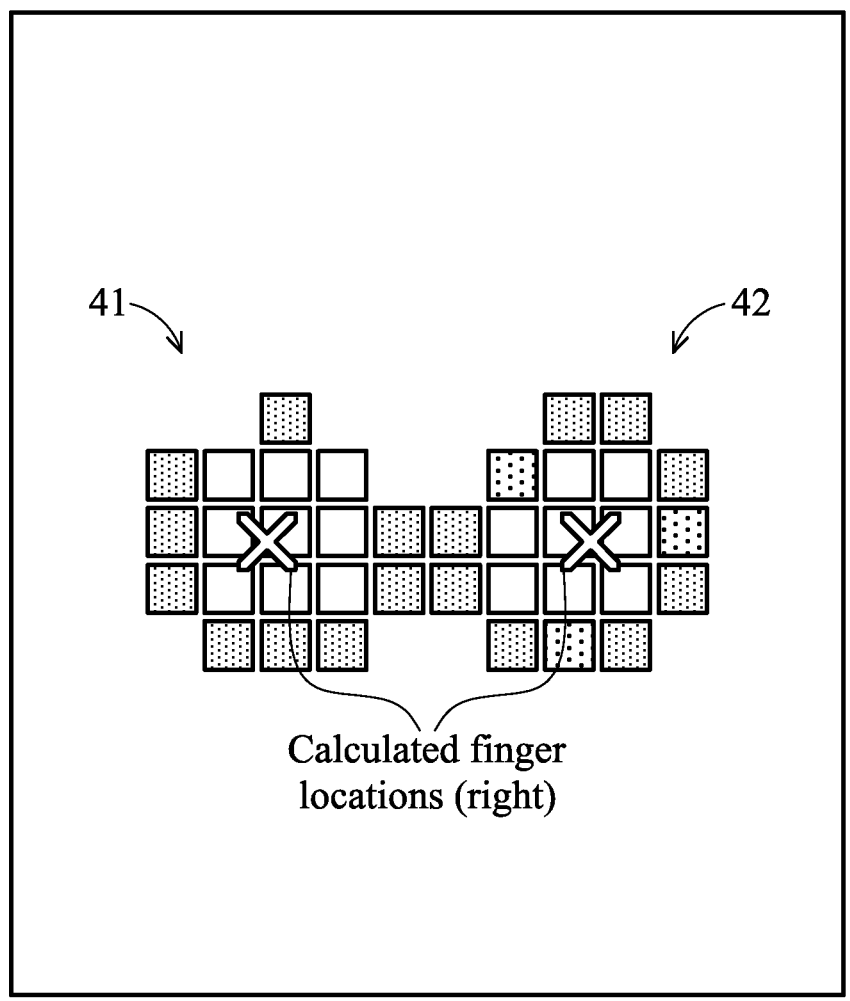
FIG. 8B shows a situation where two fingers are detected as having a V zone occupying two coordinates.

FIG. 8 shows an input detection result according to the input detection method and input detection device of the Embodiment 1. FIG. 8A shows a situation where two fingers are detected as having a V zone occupying one coordinate. FIG. 8B shows a situation where two fingers are detected as having a V zone occupying two coordinates.

In FIG. 8A, though the finger touch inputs and the detection data are the same as those in FIG. 7A, the contact image 61 is attached with Label 1 and the contact image 62 is attached with Label 2. Label 1 and Label 2 are detected separately. Then after calculation, the central location of the contact image 61 and the central location of the contact image 62 are determined as the coordinates of the locations of the contact images 61 and 62, respectively. In FIG. 8A, a one-coordinate non-contact area 64 located between the contact areas 63 and 65 is detected in the scanning of the lowest line. Therefore, the separation algorism is performed, and the contact image 61 is attached with Label 1 and the contact image 62 is attached with Label 2, so as to detect touch inputs of two fingers separately.

In FIG. 8A, though the finger touch inputs and the detection data are the same as those in FIG. 7A, the contact image 61 is attached with Label 1 and the contact image 62 is attached with Label 2. Multiple touch inputs are detected separately. The central location of the contact image 61 and the central location of the contact image 62 are determined as the coordinates of the locations of the contact images 61 and 62, respectively. Correct locations are detected. Because FIG. 8B is the same as FIG. 4, the reference numbers are the same as those in FIG. 4 and detailed description thereof is omitted.

As described above, in the conventional input detection method and input detection device, multiple close touch inputs are determined as a lump. It is difficult to detect the multiple close touch inputs separately. However, according to the input detection method and input detection device of the Embodiment 1, multiple touch inputs are detected correctly by determining the existence of the V zone 153 and performing the separation algorism. Furthermore, multiple touch inputs are detected by a simple structured device without complicated calculations such as image processing, thereby meeting requirements of a small-scale and low cost.

Figure 9:
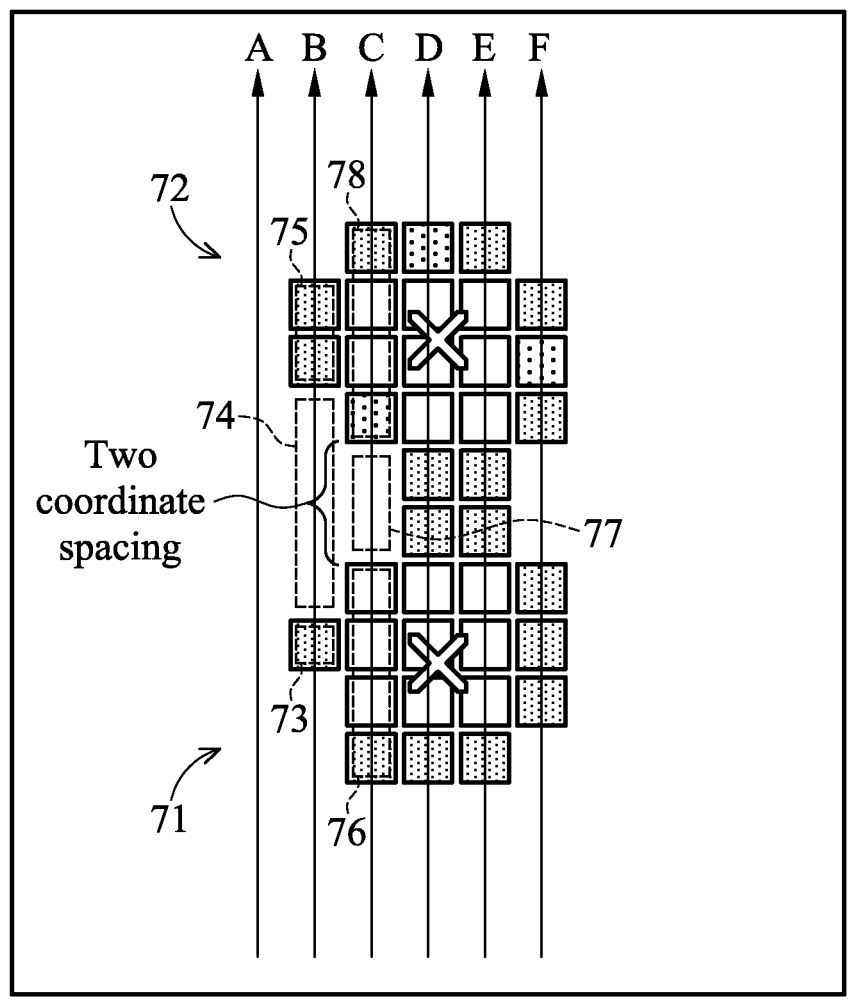
FIG. 9 is a diagram showing an example of the input detection method and the input detection device in accordance with the Embodiment 2.

FIG. 9 is a diagram showing an example of the input detection method and the input detection device in accordance with the Embodiment 2. In the input detection method and device in accordance with the Embodiment 1, an example is described, where the input surface of the touch sensor 30 is input with touch inputs by two fingers arranged in the horizontal direction, and the data pattern including a predetermined spacing of the non-contact area 44 located between two contact areas 43 and 45 is shown in horizontal lines. In the input detection method and device in accordance with the Embodiment 2, an example is described, where the input surface of the touch sensor 30 is input with touch inputs by two fingers arranged in the vertical direction. In the Embodiment 2, a separation algorism is also activated for a non-contact area which possesses less than 2 coordinates. Elements in the Embodiment 2 which are identical to the elements in the Embodiment 1 are marked with the same reference numbers and the description thereof is omitted.

In FIG. 9, a state where contact images 71 and 72 of two fingers are arranged in the vertical direction is detected. Under this state, the horizontal scanning can not detect a signal pattern representing a non-contact area sandwiched by two contact area, so multiple touch inputs can not be detected. For this case, vertical scanning rather than the horizontal scanning can be adopted to detect the multiple touch inputs. In FIG. 9, the vertical scanning is performed from the left side to the right side, and each vertical line is scanned from the bottom to the top.

Line A is scanned from the bottom to the top in the vertical direction. At this time, a contact area 73 is detected and attached with Label 1, and after a non-contact area 74 is detected the contact area 75 is detected and attached with Label 2. However, a separation algorism is not activated because the non-contact area 74 possesses 4 coordinates.

Note that the vertical scanning can be implemented by the vertical scanning part 82. Label attaching can be implemented by the labeling part 91. Determination of whether the non-contact area 74 is a separation area can be implemented by the separation area detection part 92.

On line B, a two-coordinate non-contact area 77 sandwiched by two contact areas 76 and 78 is detected by the scanning of the vertical scanning part 82. The contact areas 76 and 78 are attached with Label 1 and Label 2 in sequence by the labeling part 91. Because the non-contact area 77 possesses two coordinates, the non-contact area 77 is determined as a separation area and the separation algorism is activated. The location coordinates of the separation area (the non-contact area 77) are stored in the memory device 100 if necessary.

On line C, the area shifted form the separation area detected and determined on the previous line B is switched off, and the scanning for line C is performed. In this way, because a separation area is also detected on line C, the operation performed on the line B is performed again for line C.

On line D, the operation is the same as that of line C. Because the signal pattern of line D is the same as that of line C, the separation algorism is also activated for the next line E.

On line E, though the switched-off area is identical to the actual non-contact area, line E is also scanned after the two coordinates are switched off. The separation algorism is also activated for the next line F.

On line F, because the entire line is a non-contact area including the switched-off area, the separation algorism is not activated for the next line. After all lines are scanned in the vertical direction, Label 1 and Label 2 are detected separately, and the multiple touch inputs arranged in the vertical direction can be detected separately.

In this way, in the case of multiple touch inputs formed by two fingers arranged in the vertical direction, the multiple touch inputs can be detected correctly by setting the scanning direction to the vertical direction.

Suppose that an input operation of the multiple touch inputs is always performed in the vertical direction, in this case, the input detection method and device with only vertical scanning can be utilized. However, in the case where an input operation of the multiple touch inputs may be performed in the horizontal direction or the vertical direction, it is possible to perform the horizontal scanning first to adopt the separation algorism described in the Embodiment 1 and after that perform the vertical scanning to adopt the separation algorism described in the Embodiment 2. Therefore, even a separation area sandwiched by two contact areas is detected in any one of the horizontal direction and the vertical direction, because the separation algorism is always adopted, the locations of the multiple touch inputs arranged in various different directions can be detected. Of course, any one of the horizontal scanning and the vertical scanning can be performed first.

Figure 10:
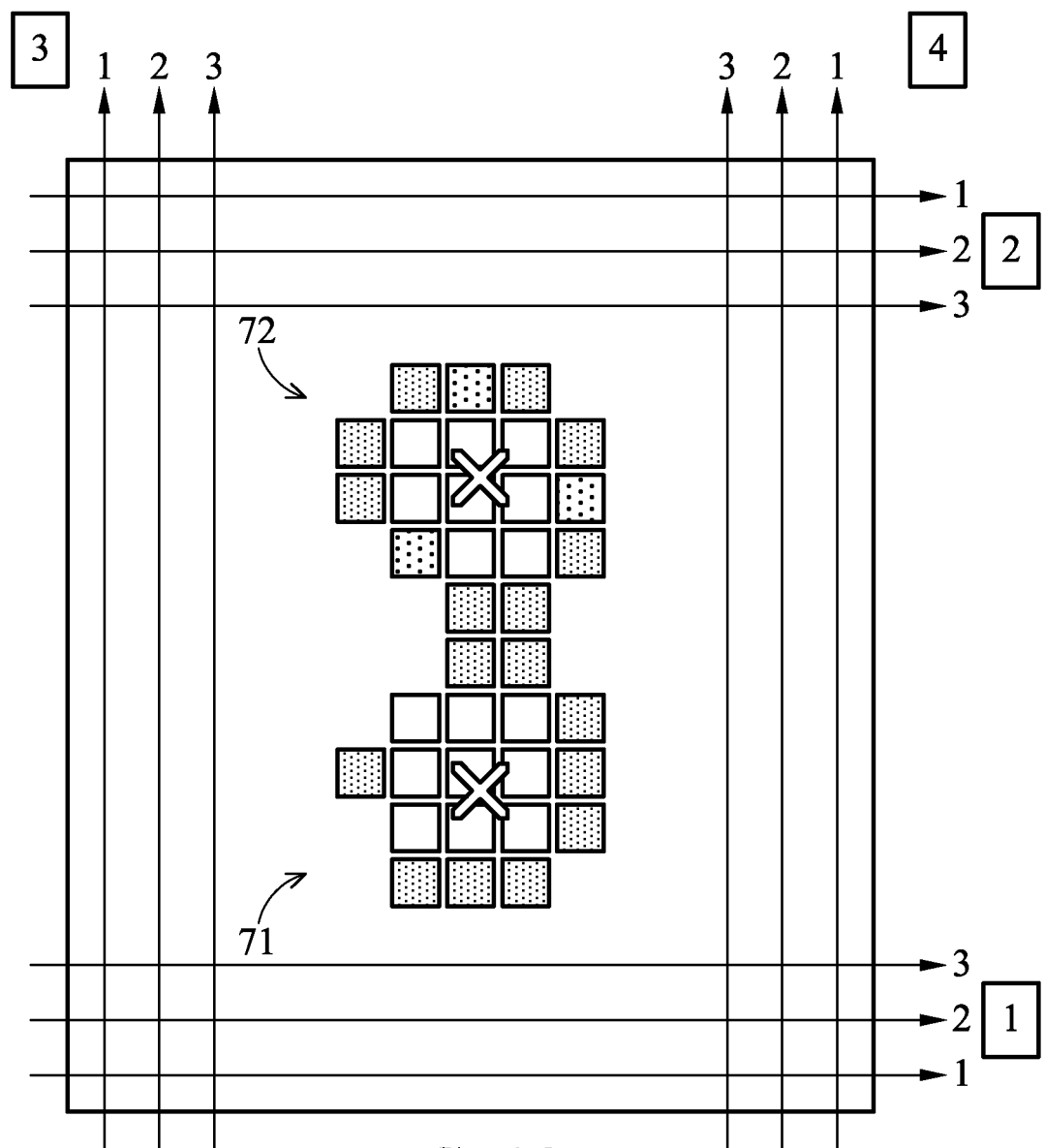
FIG. 10 is a diagram showing an example of the input detection method and the input detection device in accordance with the Embodiment 3.

FIG. 10 is a diagram showing an example of the input detection method and the input detection device in accordance with the Embodiment 3. In the Embodiment 2, an example is described, where the horizontal scanning and the vertical scanning are both performed to detect the multiple touch inputs. In the Embodiment 3, in addition to scanning in both the horizontal direction and the vertical direction, the horizontal scanning includes two types: scanning from the bottom line to the top line and scanning from the top line to the bottom line. Similarly, the vertical scanning includes two types: scanning from the left line to the right line and scanning from the right line to the left line.

In FIG. 10, for horizontal lines, after scanning from the bottom line to the top line, the horizontal scanning is performed from the top line to the bottom line. For each horizontal line, the two types both scan, for example, from the left side to the right side. After two times of horizontal scanning, for vertical lines, the vertical scanning is performed from the left line to the right line. Once all vertical lines are scanned, the vertical scanning is performed with a different sequence from the right line to the left line. For each vertical line, the two types both scan, for example, from the bottom side to the top side. After the left vertical line is scanned, scanning of four directions is finished, and each touch point is calculated form the label.

In this way, by scanning along four directions, multiple touch inputs can be detected. The sequence of the scanning can be set in various ways according the purpose. The input device of the Embodiment 3 can be identical to the input device shown in FIG. 1 of the Embodiment 1 as long as the horizontal scanning part 81 and the vertical scanning part 82 are provided with the function of scanning horizontal lines and vertical lines in different sequences.

According to the input detection method and device of the Embodiment 3, locations of multiple touch inputs can be detected by a plurality of times of scanning from different directions.

FIG. 11 is a diagram showing an example of the structure of the input detection device in accordance with the Embodiment 4. In the Embodiment 1 to the Embodiment 3, an example is described, where stripe-shaped X electrodes 10 and Y electrodes 20 form the input detection device. In the Embodiment 4, an example is described, where other shaped X electrodes 10 and Y electrodes 20 form the input detection device.

Figure 11A:
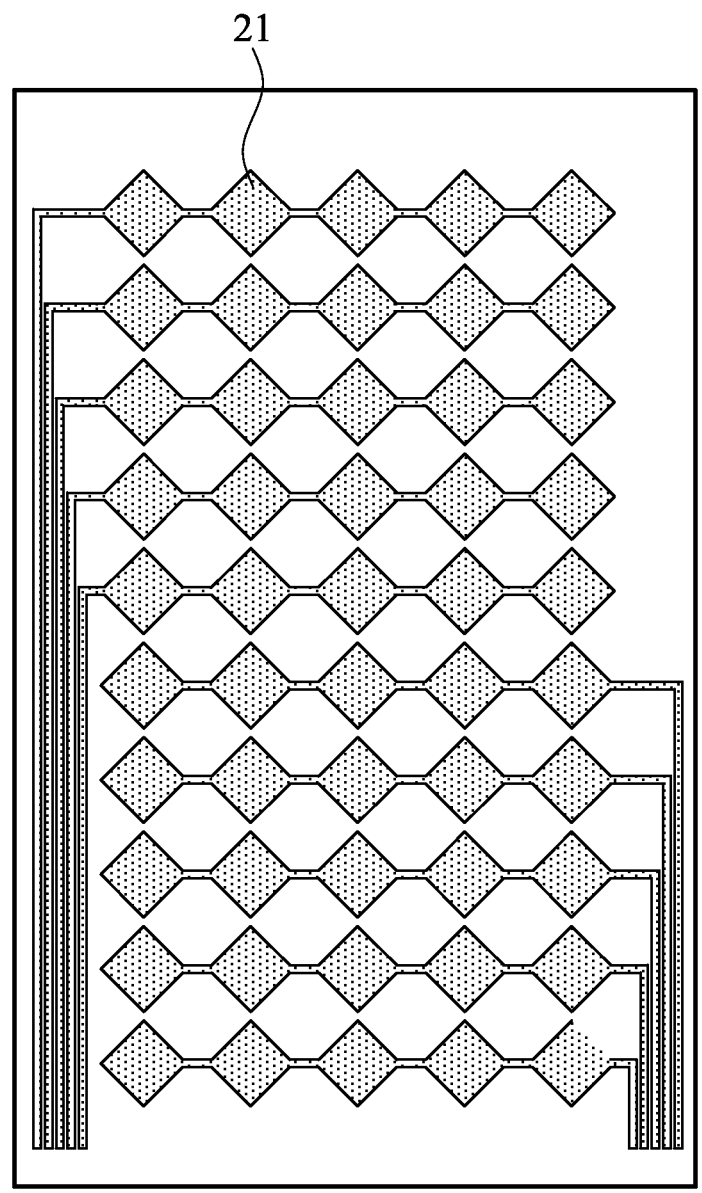
FIG. 11A shows an example of the structure of the Y electrodes.

FIG. 11A shows an example of the structure of the Y electrodes 21. As shown in FIG. 11A, in the input detection device of the Embodiment 4, a Y electrode 21 is constructed by many small squares arranged along the horizontal direction, wherein a square is connected to the adjacent squares with angles thereof. In considering the arrangement of the entire structure, a plurality of the Y electrodes 21 are equal to a plurality of electrode lines arranged parallel to each other along the horizontal direction. Namely, as a whole, the pattern of the Y electrodes 21 is equal to that of the Y electrodes 20 as shown in FIG. 2.

Figure 11B:
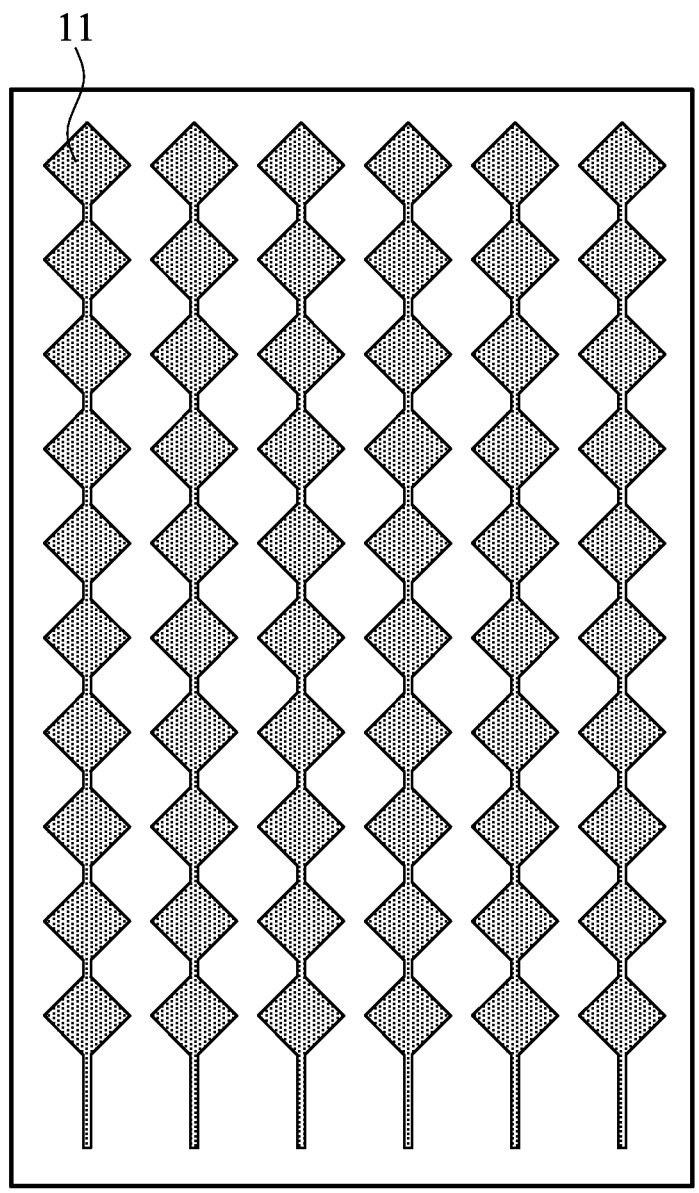
FIG. 11B shows an example of the structure of the X electrodes.

FIG. 11B shows an example of the structure of the X electrodes 11. As shown in FIG. 11B, in the input detection device of the Embodiment 4, an X electrode 11 is constructed by many small squares arranged along the vertical direction, wherein a square is connected to the adjacent squares with angles thereof. In considering the arrangement of the entire structure, a plurality of X electrodes 11 are equal to a plurality of electrode lines arranged parallel to each other along the vertical direction. Namely, as a whole, the pattern of the X electrodes 11 is equal to that of the X electrodes 10 shown in FIG. 2.

Figure 12A:
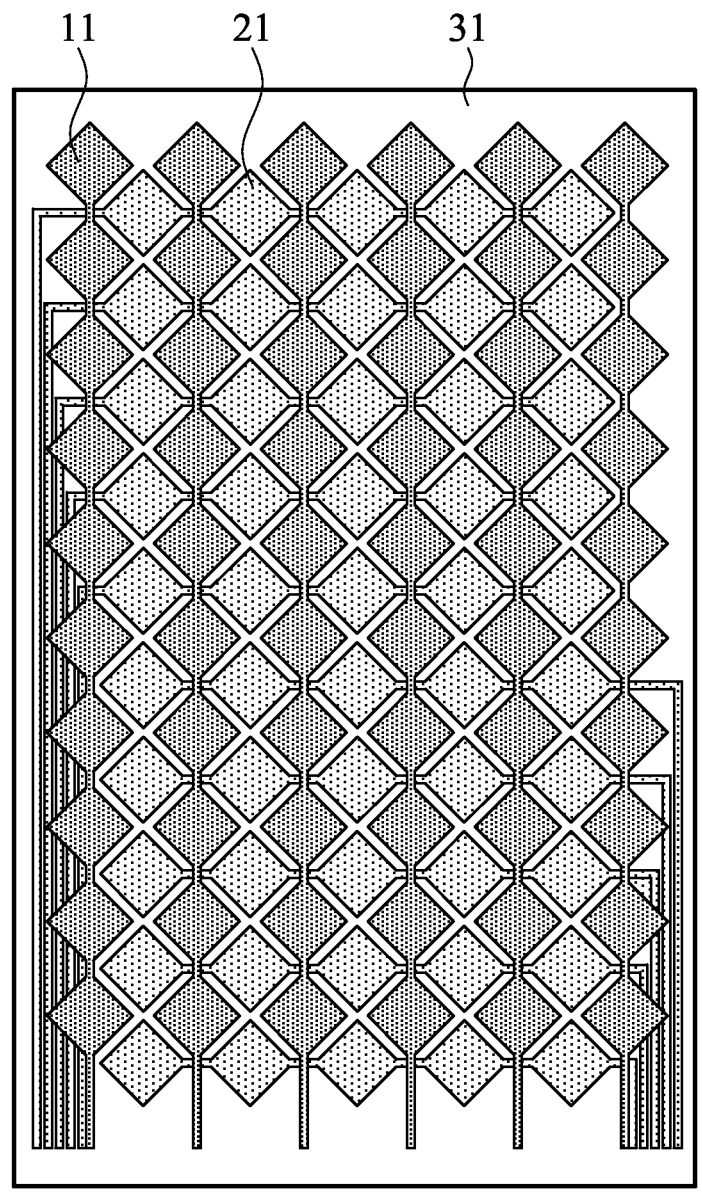
FIG. 12A is a plan view showing a touch sensor electrode part provided with the X electrodes and the Y electrodes which are overlapped.
Figure 12B:
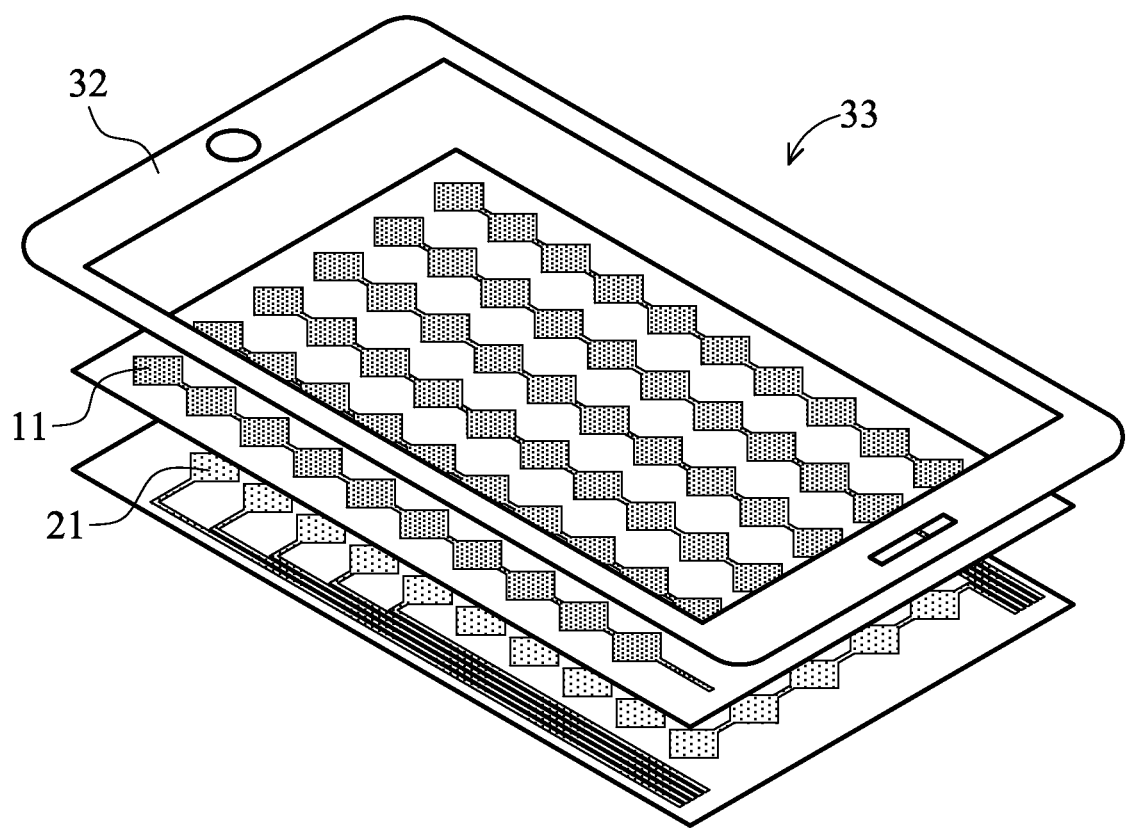
FIG. 12B is a stereogram showing the entire structure of the touch sensor including a glass cover.

FIG. 12 is a diagram showing that the X electrodes 11 and the Y electrodes 21 are overlapped. FIG. 12A is a plan view showing a touch sensor electrode part 31 provided with the X electrodes 11 and the Y electrodes 21 which are overlapped. FIG. 12B is a stereogram showing the entire structure of the touch sensor 33 including a glass cover 32.

In FIG. 12A, the arrangement for the X electrodes 11 and the Y electrodes 21 make the small squares not overlap with each other. The X electrodes 11 and the Y electrodes 21 are arranged in a matrix, forming the touch sensor electrode part 31 having electrode lines arranged along the X direction and the Y direction. In this way, the touch sensor electrode part 31 can be formed by the serial-square-shaped X electrodes 11 and Y electrodes 21.

In FIG. 12B, an example is described, where a glass cover is disposed above the X electrode 11 and the Y electrode 21. In this way, the touch sensor 33 can be formed by covering the touch sensor electrode part 31 by the glass cover 32.

For example, an input detection device of the invention can be constructed by the above mentioned touch sensor electrode part 31 and the touch sensor controller 110 shown in FIG. 1, and the input detection method shown in any one of the Embodiments 1~3 is applied to detect multiple touch inputs appropriately.

As described above, the electrode structure for the touch sensors 30 and 33 can be made to various shapes according to the purpose.

Figure 13:
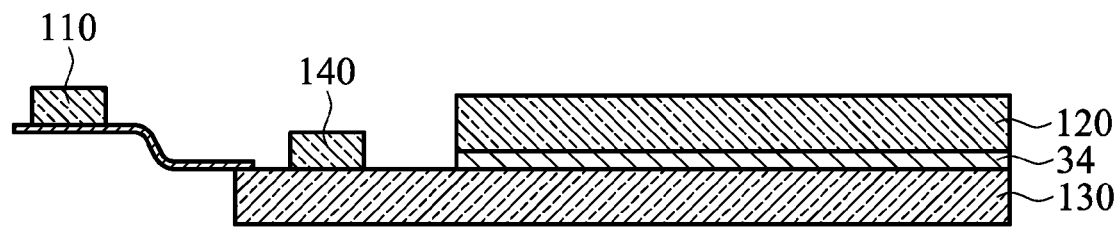
FIG. 13 is a diagram showing an example of the input detection device in accordance with the Embodiment 5.

FIG. 13 is a diagram showing an example of the input detection device in accordance with the Embodiment 5. The input detection device of the Embodiment 5 is an in-cell type touch panel. The input detection device comprises a touch sensor 34, a color filter glass 120, an array glass 130, a touch sensor controller 110, and a liquid crystal driving circuit 140.

The input detection device of the Embodiment 5 is a structure wherein a touch sensor module is incorporated in a liquid crystal module. In FIG. 13, the touch sensor 34 and touch sensor controller 110 form the touch sensor module, and the color filter glass 120, the array glass 130, and the liquid crystal driving circuit 140 form the liquid crystal module.

The color filter glass 120 and the array glass 130 sandwich the touch sensor 34, namely, the touch sensor module is incorporated in the liquid crystal module.

The input detection device of the Embodiment 5 can be constructed by a kind of the in-cell type touch panel, wherein the touch sensor 34 can adopt touch sensors with many kinds of electrode structures, comprising the touch sensor 30 described in the Embodiment 1, and the touch sensor 33 described in the Embodiment 4.

The touch sensor controller 110 adopts a touch sensor capable of performing the separation algorism described in the Embodiments 1~3.

According to the input detection device, the input detection device can be made thinner, multiple touch inputs can be detected accurately, and a multi-touch panel with minimal wrong responses can be obtained.

Figure 14:
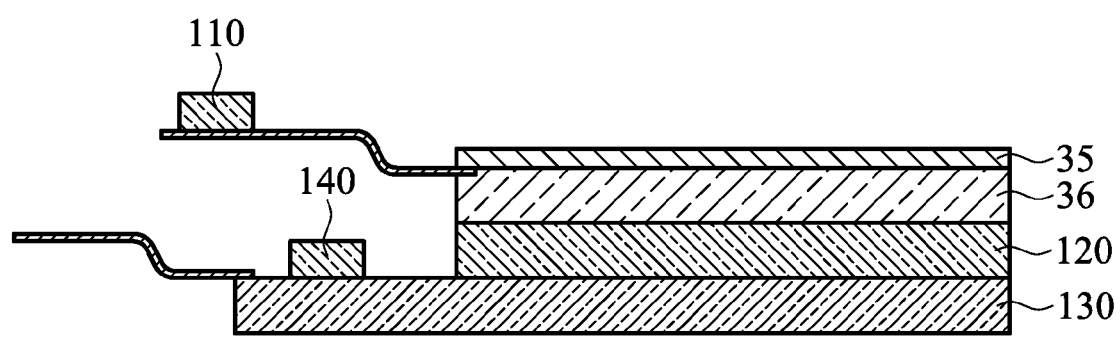
FIG. 14 is a diagram showing an example of the input detection device in accordance with the Embodiment 6.

FIG. 14 is a diagram showing an example of the input detection device in accordance with the Embodiment 6. The input detection device of the Embodiment 6 is a liquid crystal display panel wherein the touch sensor module and the liquid crystal display module are disposed independently.

The input detection device of the Embodiment 6 comprises a touch sensor 35, a sensor glass 36, a touch sensor controller 110, a color filter glass 120, an array glass 130, and a liquid crystal driving circuit 140. The touch sensor 35, the sensor glass 36, and touch sensor controller 110 form the touch sensor module, and the color filter glass 120, the array glass 130, and the liquid crystal driving circuit 140 form the liquid crystal module.

The input detection device 35 of the Embodiment 5 can adopt touch sensors with many kinds of electrode structures, comprising the touch sensor 30 described in the Embodiment 1, and the touch sensor 33 described in the Embodiment 4.

The touch sensor controller 110 adopts a touch sensor capable of performing the separation algorithm described in the Embodiments 1~3. Therefore, multiple touch inputs are detected accurately by a simple structure.

According to the input detection device of the Embodiment 6, the thickness of the input detection device becomes thicker, but multiple touch inputs can be detected more accurately without the influence of electrostatic charges from the liquid crystal display.

As a modification of the Embodiment 6, an on-cell type structure can also be utilized, wherein for the structure shown in FIG. 14, the sensor glass 36 is removed and the touch sensor 35 is disposed directly on the color filter glass 120. In the on-cell type touch panel, touch sensor controller 110 capable of performing the separation algorism described in the Embodiments 1~3 can still be utilized to detect multiple touch inputs accurately.

As described above, the separation algorism described in the Embodiments 1~3 can be applied to various kinds of input detection devices.

In the Embodiments 1~6, the invention is an input detection method or an input detection device, wherein the separation algorism is performed by the touch sensor controller 110. However, the invention can be an input detection program executed by a computer to perform the separation algorism, or a media storing the above program and read by a computer.

So far, a projected mutual capacitive touch panel with electrodes arranged in a matrix is described, but an independent bottom type of a projected self capacitive touch panel with electrodes arranged in a matrix is also preferred as long as the bottom size is very small and delicate.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention can be utilized in all kinds of input devices wherein the input operation is performed by a touch sensor, a touch panel, or etc.

What is claimed is:

1. An input detection method for separately detecting multiple touches input to a touch sensor, wherein the touch sensor is provided with a plurality of electrodes arranged in a matrix, and the touch sensor detects the multiple touches by sequentially scanning electrode lines where the electrodes are arranged, comprising:
   (a) scanning a first electrode line to detect whether a plurality of contact areas sandwiching a non-touch area exist in the scanning direction;
   (b) labeling the plurality of contact areas in sequence;
   (c) determining the non-contact area between the labels as a separation area in the case where the non-touch area between the labels is within a predetermined spacing of a distance of one coordinate or two coordinates in a predetermined coordinate system;
   (d) handling an area on a second electrode line, which is to be scanned after the first electrode line, as a separation area comprising of a non-contact area, wherein the location of the area on the second electrode line directly corresponds to the location of the separation area detected on the first electrode line prior to scanning the second electrode line; and
   (e) performing steps (a)~(d) in sequence for each electrode line, and finding the central locations of the touches according to the labels.

2. The input detection method as claimed in claim 1, wherein the electrodes are scanned from at least one direction parallel to the column or the row of the matrix.

3. The input detection method as claimed in claim 2, wherein the electrodes are scanned from two directions which are parallel to the column and the row of the matrix, respectively.

4. The input detection method as claimed in claim 3, wherein after all of the electrodes are scanned from one direction, scanning from the other direction begins.

5. The input detection method as claimed in claim 4, wherein scanning along the horizontal direction comprises scanning from the bottom electrode line to the top electrode line and scanning from the top electrode line to the bottom electrode line, and scanning along the vertical direction comprises scanning from the left electrode line to the right electrode line and scanning from the right electrode line to the left electrode line.

6. A non-transitory computer readable media storing an input detection program, wherein the input detection program is executed by the computer to perform the input detection method as claimed in claim 1.

7. An input detection program executed by a computer to perform the input detection method as claimed in claim 1.

8. An input detection device, for separately detecting multiple touches input to a touch sensor, wherein the touch sensor is provided with a plurality of electrodes arranged in a matrix, and the touch sensor detects the multiple touches by sequentially scanning electrode lines where the electrodes are arranged, comprising:

a scanning part scanning a first electrode line to detect whether a plurality of contact areas sandwiching a non-touch area exist;

a labeling part labeling the plurality of contact areas in sequence;

a separation area detection part determining the non-contact area between the labels as a separation area in the case where the non-touch area between the labels is within a predetermined spacing of a distance of one coordinate or two coordinates in a predetermined coordinate system;

a positive switch-off part handling an area on a second electrode line, which is to be scanned after the first electrode line, as a separation area comprising of a non-contact area, wherein the location of the area on the second electrode line directly corresponds to the location of the separation area detected on the first electrode line prior to scanning the second electrode line; and a location calculation part calculating the central locations of the touches according to the labels after the scanning part, the labeling part, separation area detection part, and the positive switch-off part finish operations for each of the electrode lines.

9. The input detection device as claimed in claim 7, wherein the electrodes are scanned from at least one direction parallel to the column or the row of the matrix.

10. The input detection device as claimed in claim 9, wherein the electrodes are scanned from two directions which are parallel to the column and the row of the matrix, respectively.

11. The input detection device as claimed in claim 10, wherein after all of the electrodes are scanned from one direction, scanning from the other direction begins.

12. The input detection device as claimed in claim 11, wherein scanning along the horizontal direction comprises scanning from the bottom electrode line to the top electrode line and scanning from the top electrode line to the bottom electrode line, and scanning along the vertical direction comprises scanning from the left electrode line to the right electrode line and scanning from the right electrode line to the left electrode line.

13. The input detection device as claimed in claim 8, further comprising a touch sensor module and a driving circuit for the touch sensor module.

14. The input detection device as claimed in claim 13, further comprising a liquid crystal display device displaying the input image of the touch sensor, wherein the liquid crystal display device is disposed so as to be overlapped with the touch sensor.

* * * * *